No. 680,411. Patented Aug. 13, 1901.
M. F. DOCKERY.
NUMBER CHART.
(Application filed June 29, 1900.)
(No Model.)
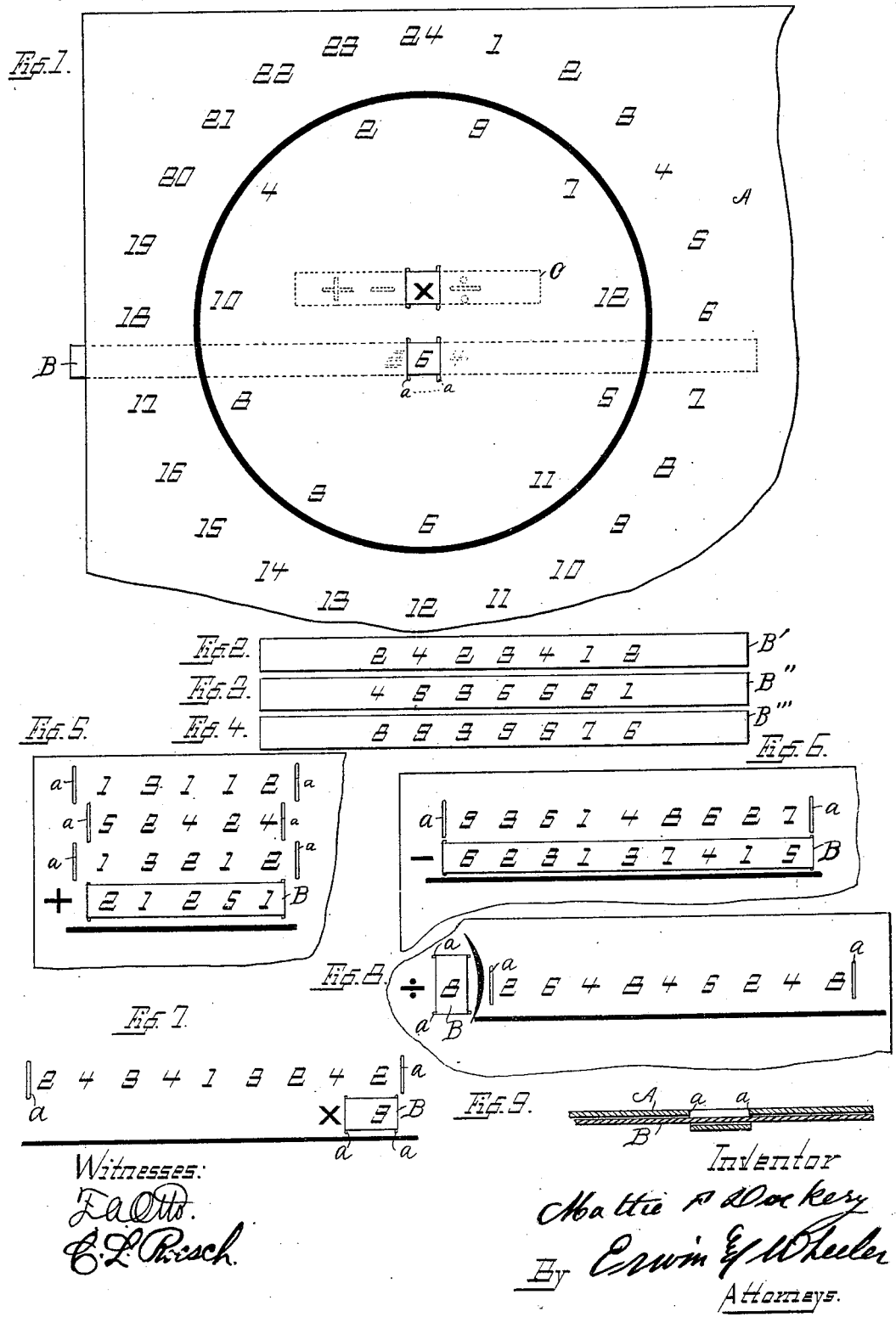

UNITED STATES PATENT OFFICE.

MATTIE F. DOCKERY, OF WHITEWATER, WISCONSIN.

NUMBER-CHART.

SPECIFICATION forming part of Letters Patent No. 680,411, dated August 13, 1901.

Application filed June 29, 1900. Serial No. 22,041. (No model.)

*To all whom it may concern:*

Be it known that I, MATTIE F. DOCKERY, a citizen of the United States, residing at Whitewater, in the county of Walworth and State of Wisconsin, have invented new and useful Improvements in Complete Number-Charts, of which the following is a specification.

My invention relates to improvements in number-charts.

Heretofore charts have been employed illustrative of some one of the fundamental rules of arithmetic; but these have been found objectionable, owing to the tendency of the pupils to memorize the various combinations and their results.

The object of my invention is to provide a form of chart which will not be merely illustrative, but which will contain a complete series of interchangeable digits for all the factors of a problem, whereby a single chart may be manipulated to present a practically unlimited number of problems.

My invention also has for its object the provision of means whereby a single chart may be used for teaching any one or all of the four fundamental rules of arithmetic, together with means for increasing or diminishing the numerical importance of the various factors or elements of a problem, in accordance with the capacity of the pupil to make the calculations presented.

In the following description reference is had to the accompanying drawings, in which—

Figure 1 is a view of a portion of one of my improved charts as arranged for the simplest problems. Figs. 2, 3, and 4 are views of the respective number-slides. Figs. 5, 6, 7, and 8 are views of portions of my improved chart, showing the same as used for teaching addition, subtraction, multiplication, and division, respectively. Fig. 9 is a detailed sectional view drawn longitudinally through the slide covering the divisor shown in Fig. 8.

Like parts are identified by the same reference-letters throughout the several views.

The chart A is provided with parallel slots *a a*, near which are grouped a series of numbers, as shown in Fig. 1. A number-slide B, of cardboard or other suitable material, is inserted through the slots in such a manner as to cover the intervening space on the face of the chart, the remainder of the slide being covered by the chart.

In Fig. 1 I have shown series of numbers grouped in concentric circles around the slots and the exposed portion of the slide, and I have also provided for indicating the nature of the operation to be performed by means of a sign-slide C, upon which are printed the four signs of addition, subtraction, multiplication, and division, respectively. This slide is inserted through parallel slots and held in the same manner as the slide B and with one of the signs exposed on the face of the chart. The construction shown in this figure is designed especially for the simpler mathematical problems. In use the teacher points to a number in one of the circular groups around the exposed portion of the slide, whereupon it is understood by the pupil that such number is to be added to, subtracted from, multiplied by, or divided by the central or exposed slide-number, and the nature of the operation to be performed is indicated by the slide C. For example, when the adjustment is as indicated in Fig. 1, if the number "10" is pointed out in either of the circles it will be understood that such number is to be multiplied by the number "6," which is exposed on the slide in the central portion of the chart. If, however, the slide C should be changed to expose the minus-sign, it would be understood that the number "6" was to be subtracted from the number "10." If the plus-sign is exposed, the "6" will be added, and if the division-sign is exposed the number "10" will be divided by the number "6."

Figure 5 represents an addition-column in which the slots *a a* are located, one on each side of the various numbers composing the column, so that by means of the slides all the digits may be shifted or replaced. In Fig. 6 the slide may be similarly used to vary both the minuend and the subtrahend indefinitely, as is also the case with the multiplicand and multiplier in Fig. 7 and the dividend and divisor in Fig. 8.

It will be understood that the arrangement shown in Fig. 1 is intended for the simpler problems of mental arithmetic. The arrangement shown in Figs. 5 and 8 may, however, be rendered as complex as desired.

By comparing the slide B (shown in Fig. 5)

with the slides B', B'', and B''' (shown in Figs. 2, 3, and 4) it will be observed that they are of relatively-increasing numerical importance—i. e., when the slide B is adjusted to the addition-column of Fig. 5 each column of digits will when added together amount to less than ten, there being nothing to carry from one column to the next. With the slide B', however, the pupil will be compelled to carry from units to tens, &c.; but at most points of adjustment the pupil will not be compelled to carry twice in succession. Thus by increasing the numerical value of the slides problems may be increased in complexity in proportion to the capacity of the student.

It will be observed that the various slides are of a width adapted to cover but one of the numbers or horizontal rows of digits of the problem and that the slots a are located at each end of the number; also, that the slides contain a greater number of digits than are represented in any one number of the problem, whereby a lateral adjustment of any slide in the slots will effect a complete change in the problem, not only by introducing a new digit, but by changing the relative position of all the remaining digits of that number. I attach great importance to this provision of means for not only inserting and removing digits from a mathematical problem, but for shifting the relative position of the digits in the problem, whereby the number of changes in the problem is not limited by the number of digits on the slide or the number of slides, but is substantially unlimited in view of the fact that the digits cannot only be removed and replaced, but shifted in position, thus rendering it impossible for the memory of the student to assist in any manner at arriving at the solution of the problem.

It will of course be understood that it is not necessary that the charts should be provided with fixed numbers, as all of them may be made adjustable, if desired.

Having thus described my invention, what I claim as new, and desire to secure by Letters Patent, is—

1. The combination with a chart provided with a mathematical problem; of a series of number slides or carriers; a series of digits on each of said slides or carriers; means for mounting said slides or carriers on said chart, in positions to separately cover individual numbers of the problem; and means for adjusting said slides laterally whereby digits may be removed, shifted, replaced, or added, and the character of the problem indefinitely altered.

2. The combination with a chart provided with a mathematical problem; of a series of number slides or carriers, and a series of digits on each of said slides or carriers; said chart being provided with parallel slots or openings at the respective ends of the various numbers of the problem adapted to permit the insertion of the slides with a portion exposed on the face of the chart between the slots and a portion or portions of the slide concealed at one or both ends, whereby said slides may be adjusted laterally to alter the character of the problem, both by shifting the position of the exposed digits and introducing new digits.

3. The combination with a chart provided with a mathematical problem, and having parallel slots arranged in pairs, one at each end of each number of the problem; and a series of slides adapted to be inserted in said slots to separately cover the numbers of the problem and provided with a series of digits exceeding in number the digits of the number such slide is designed to cover, whereby a lateral adjustment of the slide will introduce new elements into the number and rearrange the remaining elements with reference to the other factors of the problem.

In testimony whereof I affix my signature in the presence of two witnesses.

MATTIE F. DOCKERY.

In presence of—
  T. M. BLACKMAN,
  WILL M. COWLES.